No. 798,810. PATENTED SEPT. 5, 1905.
J. R. LEWIS.
RAKING AND LOADING APPARATUS.
APPLICATION FILED MAR. 24, 1905.
2 SHEETS—SHEET 1.
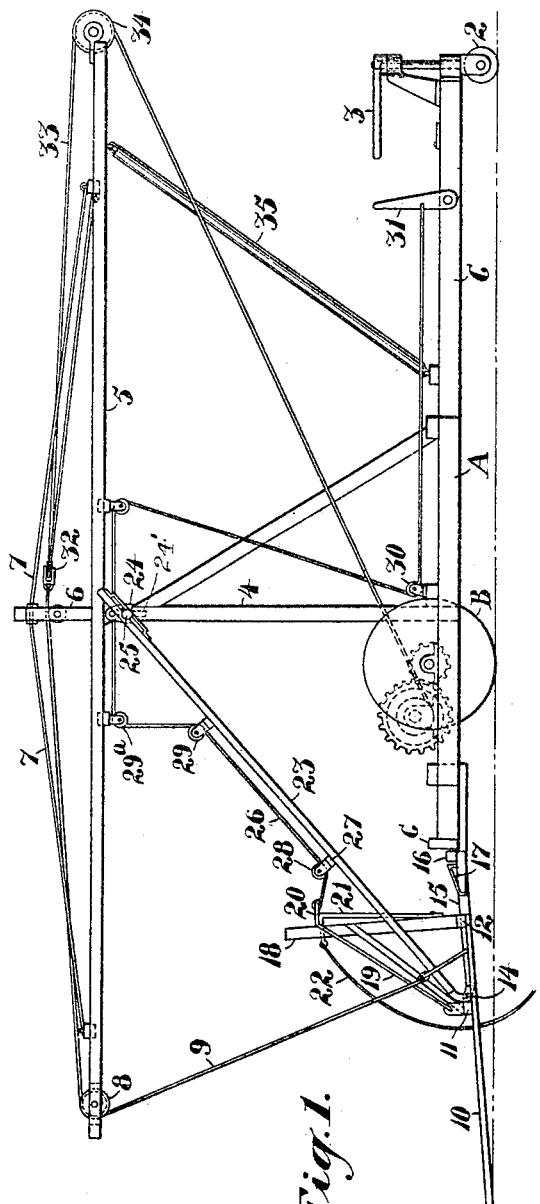
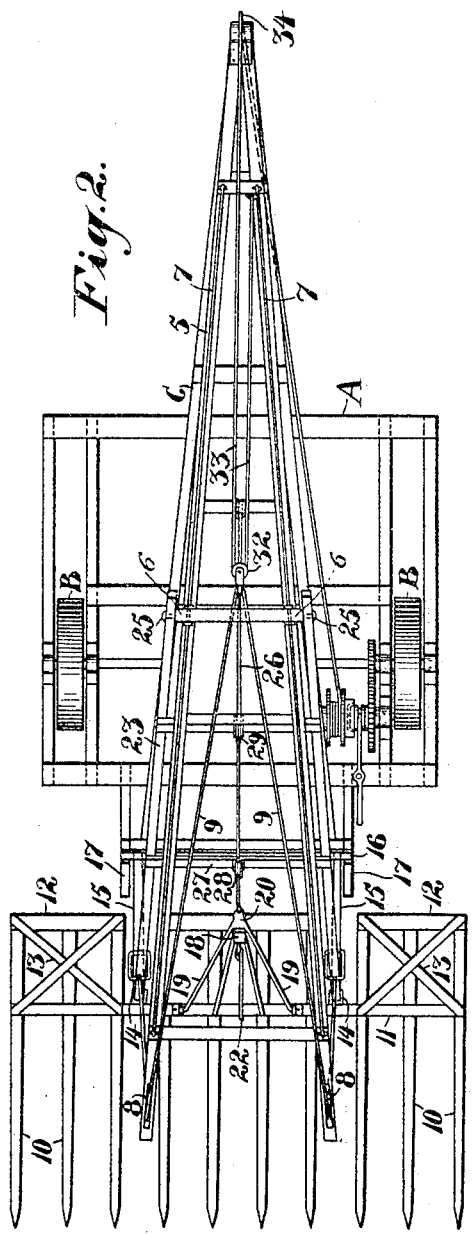
Witnesses:-
F. C. Fliedner
J. H. Nurse
Inventor,
John R. Lewis
By Geo. H. Strong.
Atty.

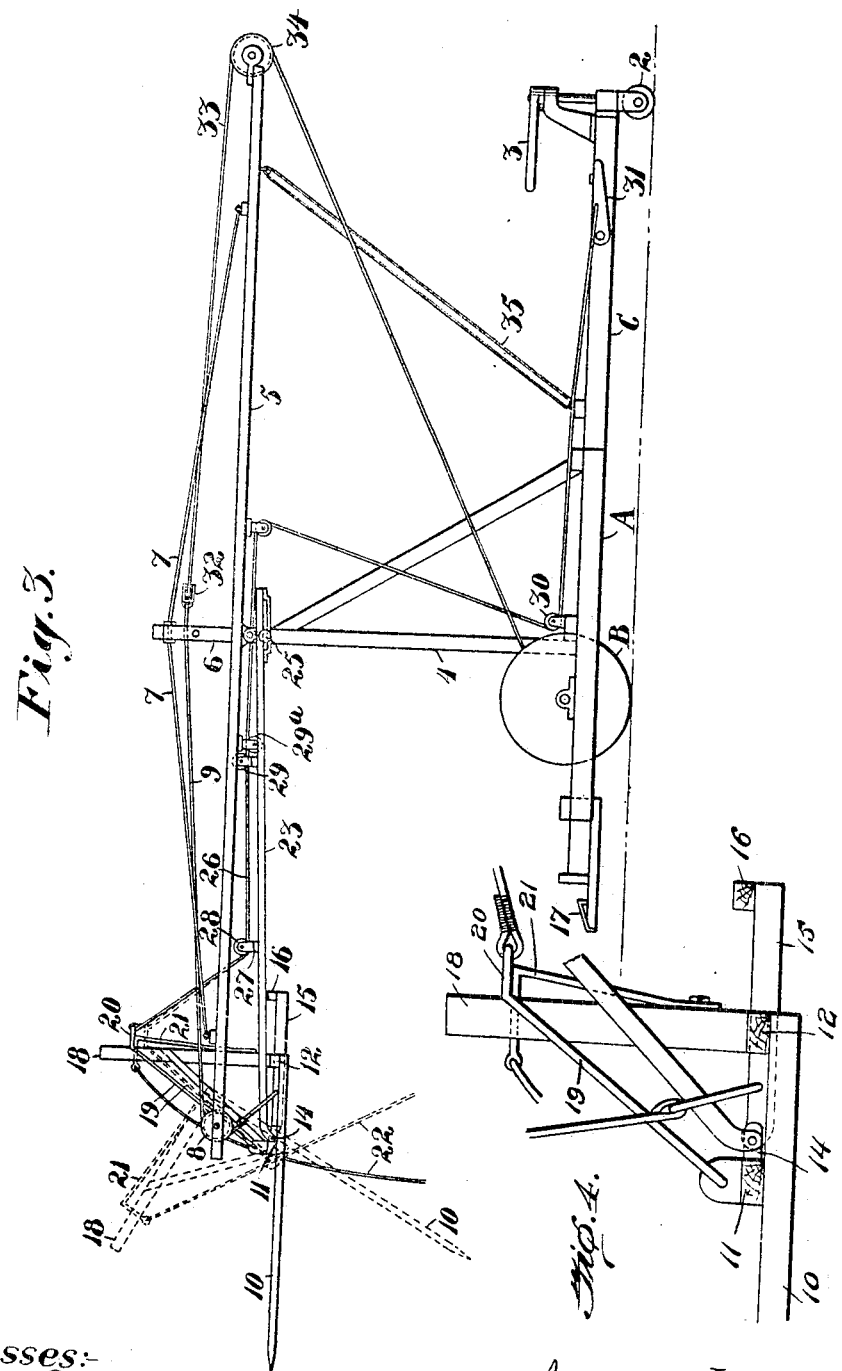

UNITED STATES PATENT OFFICE.

JOHN R. LEWIS, OF BIGGS, CALIFORNIA, ASSIGNOR OF ONE-HALF TO GUY T. LEWIS, OF BIGGS, CALIFORNIA.

RAKING AND LOADING APPARATUS.

No. 798,810.  Specification of Letters Patent.  Patented Sept. 5, 1905.

Application filed March 24, 1905. Serial No. 251,883.

*To all whom it may concern:*

Be it known that I, JOHN R. LEWIS, a citizen of the United States, residing at Biggs, in the county of Butte and State of California, have invented new and useful Improvements in Raking and Loading Apparatus, of which the following is a specification.

My invention relates to an apparatus which is designed for raking and loading hay, grain, or equivalent material, and by the use of a closed shovel it may also be employed for the digging and lifting of earth or similar material that cannot be handled by a rake.

It consists in the combination of mechanism and in details of construction which will be more fully explained by reference to the accompanying drawings, in which—

Figure 1 shows a side elevation of my apparatus. Fig. 2 is a plan view of same. Fig. 3 is a side elevation showing rake-head raised and showing dumping position in dotted lines. Fig. 4 is a detail of the gathering devices and pusher-frame and connections.

It is the object of my invention to provide an apparatus by which material may be gathered, lifted, and deposited at a distant point.

As shown in the accompanying drawings, I have illustrated my apparatus as especially designed for gathering and delivering loose material, such as hay or straw; but it will be obvious that by substituting a closed shovel for the rake herein illustrated it may be equally well employed for lifting loose or earthy material.

A represents the framework of any suitable or desired size and description, mounted upon bearing-wheels B, which are journaled to the frame, and C is an extension frame or pole which serves for the attachment of a team by which the machine is propelled. The rear end of this pole is supported upon the steering-wheel 2, the steering-post of which is vertically journaled in the end of the frame, and by means of a lever, as at 3, the operator controls the direction in which the apparatus is to move.

4 is a vertically-disposed frame mounted upon the horizontally-disposed frame A and supporting the longitudinally-extending transverse frame 5, and this frame 5 serves as a carrier-support and connections for mechanism to be hereinafter described. I have here shown the frame as having posts at 6 and truss rods or wires, as at 7, by which it is stiffened. The front end of the frame 5 has journaled in it pulleys, as at 8, over which pass the ropes 9, by which the lifting device is operated. In the present case this device is shown in the form of a rake for lifting hay and straw, this rake being composed of teeth 10, having the rear ends rigidly fixed to a rake-head 11 and with suitable transverse bars, as at 12, and braces 13.

The rake-head 11 is hinged or swiveled at 14 to a framework 15, which extends rearwardly from the hinge-points and has a cross-bar 16, which is normally engaged by the front bar of the frame C and by latches, as at 17, into which the bar 16 falls, so that it is substantially in line with the head 11 and the rake or lifting device, and when the apparatus is being pushed over the field the frame 15 serves to push the lifting device or rake, and thus cause its front to gather the material for which it is designed.

The hinging of the gathering device is such as to allow its front end to move freely over the surface, following the irregularities thereof, and to gather very closely from that surface. From the rear end of this gathering device a post 18 extends upwardly and is suitably braced, as shown. Rods 19 have their front ends pivoted or fulcrumed to the rake-head 11 and converging rearwardly terminate in a head 20 at the rear of the post 18. This head is normally engaged by a spring-latch 21, which thus holds the rake in position and when released allows it to tilt. The releasing may be effected in a manner similar to that of an ordinary hay-fork or similar device—that is, by a pull upon a rope, as at 22.

23 is a frame the front lower end of which is pivoted to the head 11, contiguous to or with the pivoting of the frame 15. This frame 23 extends rearwardly and backwardly up to a cross-beam 24, which is turnable about a vertical central pivot 24', extending into the top of the vertical frame 4.

The horizontal frame 5, previously described, is supported, as shown, upon the beam 24.

The side timbers of the frame 23 extend upwardly and have guide-slots at their upper ends which are movable or slidable upon pins or bolts 25, projecting from the ends of the beam 24, the object being to allow the frame 23 to move slidably with relation to the timber 24 as the rake is raised or depressed, as will be hereinafter described.

Connecting with the latch-plate 20 is a rope, as at 26, passing over a pulley 28 on the cross-bar 27, thence extending upward and around a pulley 29, located near the upper end of the frame 23, thence over direction-pulleys 29ª on the frame 5, thence over a direction-pulley, as at 30, on the frame A, and finally connected with a lever 31, which is fulcrumed at the rear of the frame C. This lever is normally held down or latched, so as to lie approximately horizontally. When released and turned up into a vertical position, it slackens the rope, and thus allows the plate 20 and the pieces 18, to which it is latched, to move forwardly, and this vertical movement allows the rake or collector to tilt about its pivots, so that its points or front edge will gather the material in front of it. This is the normal condition while the device is gathering its load. After the load has been gathered the lever is pressed down and latched, thus holding the post 18 in substantial contact with the cross-bar 27 and preventing the rake or gatherer from tilting forward and discharging its load when the apparatus is to be lifted after being loaded.

The operation of lifting a load is effected by a pull upon the ropes 9, which connect with the tilting frame 15 at one end and at the other end are connected with a block 32, and the rope 33 passing around this block and over a direction-pulley 34 passes down to a point where it may be operated either by attaching a horse or by means of a winding-drum driven by a motor or by connection with the main bearing-wheels B of the machine, as shown. A pull upon this rope acts first to lift the frame 15 about its pivots and bring it up against the lower part of the side bars 23. In order to prevent this pull tilting the frame 5, I have shown a post 35, having its lower end swiveled upon the pole-frame 3 and its upper end swiveled near the rear end of the frame 5. This post 35 stands at an angle, as shown, and when a direct pull is brought upon the ropes and the frame is brought into position, as previously described, a further pull will act to raise the frame 15 and 23 and the gathering apparatus or rake. As this frame and rake are lifted it will be seen that the distance between the pulley 29 and the direction-pulley 29ª on the frame 5 will be shortened as the frame 23 approaches the frame 5. Therefore the rope which connects lever 31 with the latching-head 20 will move over the pulley 29, and thus lengthening will allow the post 18 to remain substantially vertical while the rake is being lifted, and it will be seen that this motion gradually brings the heel of the rake upwardly toward the frame 15 until the frame 23 is brought nearly up to the level of the frame 5. By now swinging the frame 5 about the pivot in the top of the frame 4 and by the inclined movement of the swivel-post 35 about its lower end it will be seen that the upper end of the swivel-post will be brought downward and with it the outer end of the frame 5 as it turns, and this correspondingly raises the forward end of the frame 5 and with it the rake still remaining in a substantially horizontal position. Thus the rake may be turned so far to one side of the machine that it will stand above a wagon which is driven alongside of the machine, and when in this position the rake may be released either by a pull upon the spring-releasing rope previously described or by means of the lever 31, either of which will serve to release the rake or gathering device and allow it to tilt so as to discharge its load. This being done, the parts are returned again to their normal position, as has been previously described, and in readiness to take up another load.

Having thus described my invention, what I claim, and desire to secure by Letters Patent, is—

1. A loading apparatus comprising a wheeled frame and support, a gathering device flexibly supported at the front of the machine, a normally downwardly and forwardly inclined frame having one end flexibly connected to the gathering device and the opposite portion both pivotally and slidably connected to the wheeled frame, means whereby the second frame may be lifted from an inclined to a substantially horizontal position, to elevate the gathering device and its load, and means whereby the second frame with its suspended gathering device may be moved in a horizontal direction to a point of discharge.

2. A gathering and loading apparatus comprising a wheeled frame and support, a rake or gatherer located at the front, a normally, downwardly and forwardly inclined frame having its upper end connected with the support, a flexible connection with said inclined frame, and the rear of the gatherer, and a propelling-frame hinged to the gatherer and intermediate between it and the front of the wheeled frame.

3. In a gathering and loading apparatus, a wheeled frame and support, a normally, downwardly and forwardly inclined frame having its upper rear end connected with the support, and a rake or gatherer flexibly connected with the lower end of said frame, a second frame having its front end hinged to the gatherer and its rear end in contact with the wheeled frame to act as a propeller for the gatherer, a horizontally-disposed frame carried upon the support of the wheeled frame, direction-pulleys and blocks carried upon said horizontal frame, ropes passing over said pulleys and connected with the second frame, means by which power may be applied whereby the gatherer and its connecting-frames are raised, and a mechanism by which the gatherer is maintained substantially horizontal during its elevation.

4. A gathering and loading apparatus consisting of a wheeled frame and support, a normally, downwardly and forwardly inclined frame having its rear end connected with the upper part of the support, a rake or gatherer flexibly connected with the front end of said frame, a pusher-frame flexibly connected with the gatherer and having its rear end in contact with the main frame, a substantially horizontal frame pivoted and turnable upon the top of the wheeled-frame support, direction-pulleys and blocks with ropes through which power may be applied, said ropes connecting with the pusher-frame and a post having its lower end flexibly connected with the wheel-frame and its upper end with the swiveling frame whereby the gatherer may be raised to a point contiguous with the swivel-frame and the latter then turned to place the gatherer in a discharging position at one side of the wheel-frame.

5. A gathering and loading apparatus comprising a wheeled frame and elevated support, a normally, downwardly and forwardly inclined frame having its upper end slidably connected with the upper part of said support, and a rake or gatherer flexibly connected with its lower end, a post and latching device carried by the rear end of the gatherer, said latch being disengaged to allow the gatherer to tilt and discharge, a pushing-frame hinged to the rear of the gatherer having its rear end in contact with the front of the wheel-frame, ropes connected with said pushing-frame, a horizontally-swiveling frame carried upon the top of the wheel-frame support, with direction-pulleys over which said ropes pass, means for applying power whereby the pushing-frame is first tilted into contact with the inclined frame of the gatherer, and both frames and gatherer are then lifted, a rope passing over guide-pulleys and connected with the latch of the gatherer so that said rope is lengthened when the gatherer is raised, and the latter is maintained in a substantially horizontal position, a rigid member between the rear of the horizontally-swiveling frame and the main frame and flexibly connected to both, said member acting to guide and raise the swivel-frame after the gatherer has been raised into proximity therewith so that the gatherer is carried to one side of the apparatus and in position to be discharged.

In testimony whereof I have hereunto set my hand in presence of two subscribing witnesses.

JOHN R. LEWIS.

Witnesses:
S. H. NOURSE,
HENRY P. TRICU.